Oct. 25, 1966 R. A. HATSCHEK 3,281,612

PIEZOELECTRIC DEVICE, PARTICULARLY A FORCE MEASURING INSTRUMENT AND THE PROCESS OF MANUFACTURING SAME

Filed Aug. 19, 1963

Inventor
Rudolf A. Hatschek
By
Watson, Cole, Grindle & Watson
Attys.

United States Patent Office 3,281,612
Patented Oct. 25, 1966

3,281,612
PIEZOELECTRIC DEVICE, PARTICULARLY A FORCE MEASURING INSTRUMENT AND THE PROCESS OF MANUFACTURING SAME

Rudolf A. Hatschek, Vienna, Austria, assignor to Hans List, Graz, Austria

Filed Aug. 19, 1963, Ser. No. 303,025
Claims priority, application Austria, Sept. 12, 1962, A 7,289/62
3 Claims. (Cl. 310—9.8)

Figure 1:
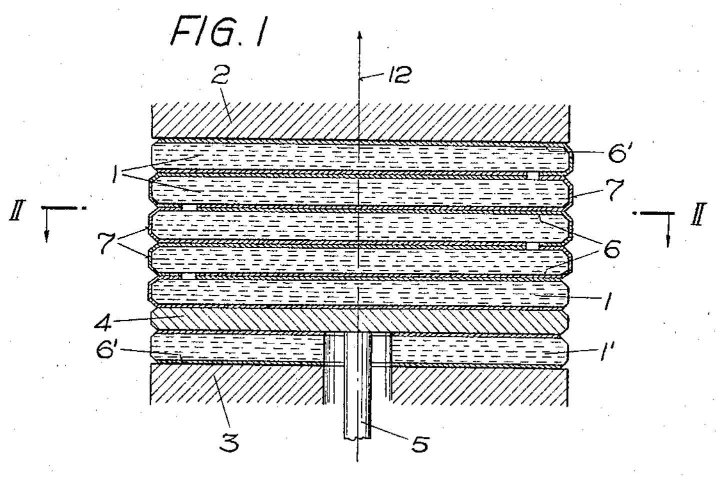

The invention relates to a piezoelectric device, particularly to a force measuring instrument comprising a piezoelement composed of at least two superimposed plates with metal layers inserted in between. This arrangement of the plates which usually consists of quartz crystals utilizes the longitudinal direct piezoelectric effect, the front surfaces of the plates being arranged in perpendicular relation to the X-axis in whose direction the force to be measured is applied to the piezoelements, an electrical load corresponding to the deformation of the plates being produced on the front surfaces.

In conventional devices of this kind the piezoelement comprises but a few, usually two superimposed quartz plates with comparatively massive metal electrodes in between and attached to the piezoelectric device with a bias. With this arrangement the sensitivity of the piezoelement depends on the number of superimposed quartz plates electrically paralleled by means of electrodes. However, the use of superimposed quartz plates in large numbers has a disadvantage insofar as even where the contact surfaces are polished, certain irregularities in the resilience of the piezoelement are liable to occur due to the fact that if the quartz plates are not superimposed with a snug fit, they are bent under loads, thereby producing a split resilience which slowly disappears only as the load increases. This kind of split resilience produces a curved characteristic of the measuring instrument.

Consequently, in actual practice piezoelectric devices comprising one or two quartz crystals only are used which are fixed in the direction of the Y-axis so as to utilize the transversal direct piezoelectric effect, electric loads being produced on the surfaces situated in perpendicular relation to the X-axis as a result of a mechanical deformation in the direction of the Y-axis. Since the electric load due to the transversal piezoelectric effect depends on the dimensions of the piezoelement, this provides a means for producing relatively sensitive piezoelectric devices even with a single crystal only and consequently, with a lesser split resilience. Even then, the maximum load yield attainable is limited particularly for structural reasons and in view of the physical properties of the piezoelectric material.

The basic idea of the invention is the realization that provided the split resilience can be adequately controlled, it should be possible to considerably increase the sensitivity of conventional piezoelectric devices by using a piezoelement comprising the required large numbers of superimposed plates of piezoelectric material. Thus the invention aims at providing a piezoelectric device utilizing the longitudinal piezoelectric effect and featuring a high degree of sensitivity, with the objectionable split resilience either substantially reduced or completely eliminated.

According to the invention this is achieved by positively jointing the plates made of piezoelectric material with metal interlinings by welding, soldering, gluing, sintering or the like processes so as to produce a solid plate assembly. As a result of the consolidation of the various components of the piezoelement the split resilience is practically eliminated so that the rigidity of the piezoelement depends essentially only on the elasticity of the material used. Consequently, the advantages of the longitudinal piezoelectric effect can be fully utilized without impairing the linearity of the characteristic of the piezoelectric device. As practical experience has shown, it is possible, by using the method according to the invention, to produce piezoelements having the same crystal volume as those comprising a single crystal utilizing the transversal piezoelectric effect and yet featuring greater sensitivity than the latter. Another advantage of the invention resides in the fact that the incorporation of the piezoelement in the piezoelectric device is simplified by the consolidation of the components of the piezoelement.

According to a further embodiment of the invention, the front surfaces of the plate assembly can be positively jointed also with the clamping device for the piezoelement, thereby eliminating split resilience completely.

According to another feature of the invention at least one electrically conductive connecting bridge may be provided on the sidewall surface of each plate for the electrical interconnection of the metal interlinings of identical load serving simultaneously as electrodes, said connecting bridge being conductively connected with the interlining on one front surface of the plate but insulatingly separated from the interlining on the other front surface of the plate. By this arrangement such measures as are necessary for the connection of the electrodes can be taken already prior to the assembling of the plate assembly so that following consolidation of the components of the piezoelement no further operations are required for that purpose, the connecting bridges resting on the sidewall surface with a tight fit so as to make the plate assembly a compact unit. In addition, the connecting bridges may be countersunk in the periphery of the plates, the notches thus produced being also available for the centering of the plates during the superimposing operation.

Where the plate assembly comprises more than two plates, each plate located inside the plate assembly is provided according to the invention with two connecting bridges offset in a peripheral direction, each of them being conductively connected with another of the two interlinings, while the extremities of the connecting bridges of adjacent plates which are electrically insulated against the interlinings are conductively interconnected. As a result of this arrangement, each electrode inside the plate assembly is conductively connected with the next but one electrode, by-passing the electrode adjoining the antipolar front surface of the same plate so that the individual elements formed by the plates are electrically paralleled. The metal interlinings constituting the electrodes as well as the connecting bridges are preferably made of thin metal coatings produced by vacuum vaporization, so that practically small geometrical dimensions of the piezoelement and consequently, high inherent frequencies are obtained. In addition, experience has shown that as a result of the positive jointing of the relatively thin crystal plates with the insertion of conductively connected metal interlinings the dynamic temperature behavior of the piezoelectric device is substantially improved.

For the manufacture of the piezoelectric device the invention provides for a process by which the plates are coated on their front surfaces with a very adhesive metal plating, then superimposed and pressed together under high pressure and at an increased temperature, thereby producing a diffusional compound between the superimposed metal coatings of adjacent plates thus ensuring positive adhesion between the latter and producing a homogeneous plate assembly. The pressure to be applied and the temperature to be used as well as the duration of the compression stage vary depending on the piezoelectric material of which the plates are made and on the composition of the metal coating. According to a preferred method, plates consisting of quartz crystals are jointed by compression at a pressure of 2 to 20 kilograms per square millimeter (approximately 3000 to 30.000 p.s.i.) and at a temperature between 100 and 530° C. (212/986° F.), preferably at 200° C. (392° F.) for about one to three hours, preferably in a vacuum. This process will not require any special equipment and ensures positive jointing of the components of the piezo-element without impairing the piezoelectric properties of the quartz crystals used for the purpose.

Preferably not only are the individual components of the plate assembled together with such conductor electrodes as may be located inside said plate assembly positively interconnected but the front surfaces of the piezo-element can also be positively connected with the housing or the like of the piezoelectric device. Preferably this is achieved by means of a diffusional compound, by first jointing the components of the piezoelement to produce a homogeneous plate assembly and then fixing the latter in a separate operation on the bearing surfaces of the piezoelectric device.

According to another variant of the method according to the invention, an additional interlining of gold for example, serving as a metallic bonding agent can be inserted between the front surfaces of adjacent plates prior to the compression of the plates provided with a metal coat as of silver or the like. This additional metal layer between the plates can be inserted by electrolytic deposition, currentless metal precipitation with ion exchange by the dipping process or similar methods, vacuum vaporization or by the insertion of foils. In order to ensure a positive jointing between the metal coating of the plates and the additional metal layer in a simple manner, the metals to be so jointed must be properly selected. A gold interlining between silver, copper or chromium-plated plates of piezoelectric material, in particular of quartz crystals, was found to be particularly suitable for the purpose. However, jointing with other metal compounds is also possible, such as for example, the use of a platinum interlining with silver or gold-plated plates and of a platinum interlining or a silver interlining with coppered plates. By the provision of an additional metal layer between the plates, the solidity of the jointing is improved on the one hand, while any unevenness between the superimposed surfaces is compensated which is particularly important for the avoidance of split resilience.

According to the invention the additional metal layer may also consist of soldering metal and the jointing of the plates can be performed by heating above melting temperature of the soldering metal. Another possibility of manufacturing the piezoelectric device according to the invention consists in applying an amalgam, such as a gold or silver amalgam to the metal-coated front surfaces of the plates and subsequently heating the plates under mechanical pressure, preferably in a vacuum until the mercury has wholly evaporated. Likewise, it is possible within the scope of the invention, to adopt a process by which metallized plates are jointed with the interposition of metal layers or without by ultrasonic welding. Finally the plates can also be jointed by sintering, a metal layer such as colloidal silver, being applied to the front surfaces to be jointed, whereupon the plate assembly is sintered at a temperature of approximately 500° C. (932° F.).

Figure 2:
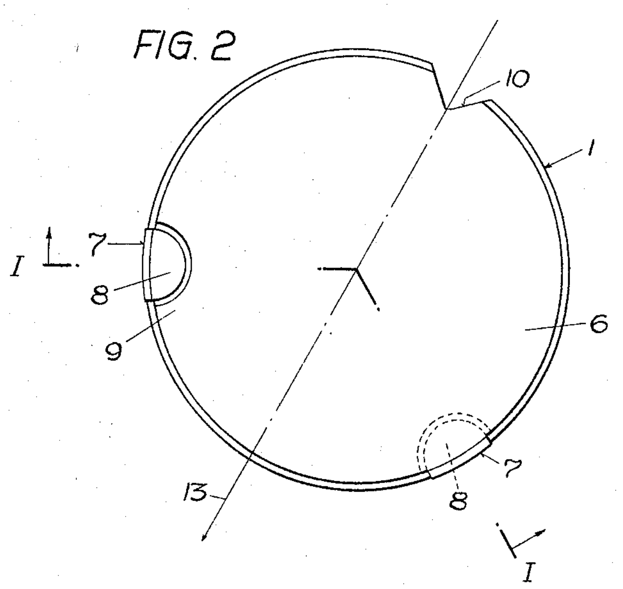
Figure 3:
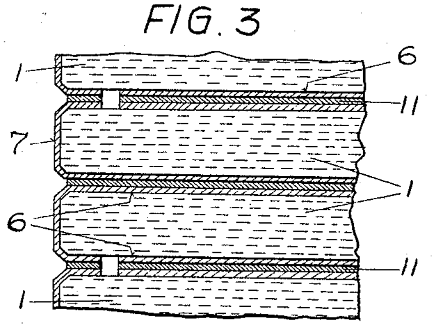

Further details of the invention will appear from the following description of several embodiments of the invention with reference to the accompanying drawing in which FIGURE 1 shows a cross-sectional view of an embodiment on line I—I of FIGURE 2, FIGURE 2 is a cross-sectional view thereof on line II—II of FIGURE 1, FIGURE 3 is a longitudinal cross-sectional view of a detail of another embodiment.

The piezoelectric device as illustrated in FIGURE 1 comprises six plates 1 of piezoelectric material such as quartz for example, superimposed so as to form a plate assembly. The plate assembly is clamped between two metal plates 2 and 3 constituting simultaneously also the ground electrode. The second outwardly extending conductor electrode 4 of the plate assembly consists of a metal plate inserted between the two bottommost plates of the plate assembly, from where an insulated conductor 5 extends through the bore of the bottommost plate 1' and the metal plate 3 to the outside. Between each of the plates 1 a metal interlining is provided which may consist of a thin metal coating 6 applied to the front surfaces of the plates 1 by vacuum vaporization or the like methods.

The plates 1 together with the conductor electrode 4 are positively jointed with the interlinings formed by the metal coatings 6 so as to constitute a compact plate assembly. They may be welded, soldered, glued or sintered or otherwise assembled to form a unit. Likewise, the front surfaces of the plate assembly are positively jointed with the metal plates 2 and 3 with the interposition of metal coats 6 preferably applied to the front surfaces of the plates 1 or 1' located at the end of the plate assembly, thereby avoiding split resilience of the plates 1, as a result of which the piezoelement features a high degree of sensitivity and presents a linear characteristic.

The metal coatings 6 applied to the front surfaces of the plates 1 can be of silver, gold, copper, chromium or the like and serve simultaneously also as intermediate electrodes for the leakance of the loads produced on the plates 1 by the deformation of same. It is not, therefore necessary in this case to insert massive intermediate electrodes between the plates 1, as a result of which the dimensions of the piezoelement and its stock can be reduced and it is possible to achieve the generally desired high inherent frequency. In the drawing, the plates 1 and the metal coatings 6 are shown on a still further enlarged scale.

The metal coatings 6 constituting the electrodes are interconnected in such a way as to obtain electrical paralleling of the individual piezoelements formed by the plates 1. For that purpose, connecting bridges 7 are provided which are applied to the sidewall surfaces of the plates 1. The connecting bridges 7 are conductively connected with the metal coating 6 on one front surface of each plate 1, but electrically insulated from the metal coating 6 on the other front surface. The plates 1 forming the interior of the plate assembly each present two connecting bridges 7 offset in a perpendicular direction, each of said connecting bridges being conductively connected with the metal coating 6 on the other front surface of the plate 1. During the assemblage of the plate assembly the plates 1 are superimposed in such a way that the insulated extremities of the two connecting bridges of adjacent plates are conductively interconnected between each pair of plates 1.

Preferably the connecting bridges 7 comprise web-shaped metal coats connected with the metal coatings 6 on the front surfaces of the plates 1 which can be deposited thereon simultaneously with the metal coatings 6 by vaporization or the like methods. As appears from FIGURE 2, the metal coating 6 is insulatingly broken in the area of the connecting bridge 7 so as to provide a contact zone 8 connected with the metal coat constituting the connecting bridge 7. In the assembled plate assembly the contact zones 8 of adjacent plates 1 facing each other are mating so that electrodes of identical loads are interconnected and conductively connected with the associated collector electrodes. When positively jointing the components of the plate assembly, such as by welding, care should be used to avoid short-circuits between the metal coatings 6 and the insulated contact zones 8, and in particular, no metal must be allowed to bridge over the separating zone 9.

As further appears from FIG. 2, in order to facilitate the accurate assembling of the plate assembly, the plates 1 may present a notch 10 on their periphery, a centering device constituted by a rod or the like engaging in said notch during the assembling operation. As a result, the superposition of the plates can be swiftly and accurately performed so that the contact zones 8 of adjacent plates will register exactly and short-circuits are precluded also during the positive jointing of the components of the plate assembly.

In the slightly modified embodiment of the invention as illustrated in FIG. 3, in addition to the metal coatings 6 applied to the plates 1, a further metal layer 11 serving as a metallic binding agent is provided between the plates 1. The metal layer 11 is introduced between the plates 1 provided with metal coatings 6 prior to the compression of said plates and can be applied to the metal coatings 6 by such methods as electrodeposition or vacuum vaporization or the like, or else a foil of suitable material can be inserted between the plates 1. If the material for the metal layer 11 has been appropriately selected, diffusion accompanied by the formation of new mixed crystals and grains will take place resulting in a particularly strong jointing between the individual plates 1 of the plate assembly. For example, experience has shown a layer 11 of gold to be particularly suitable for silver-plated plates 1 of piezoelectric material, as this metal also smoothes over such rough spots as may be left between the contacting front surfaces of superimposed plates 1. Similarly diffusion jointing can be achieved also between the front surfaces of the plate assembly and the metal plates 2 and 3 as well as between the collector electrode 4 and the adjacent plates 1, 1'. During the manufacture of the piezoelement an amalgam, such as for example, a gold or silver amalgam can be deposited on the front surfaces of the plates 1 in lieu of the metal layer 11, the plate assembly being subsequently heated under mechanical pressure, preferably in a vacuum until such time when the mercury has completely evaporated.

With the device according to the invention using for example, quartz as a piezoelectric material, the longitudinal piezoelectric effect is utilized, the force acting on the piezoelement being applied in the direction of the X-axis designated by reference number 12 in FIG. 1. However, forces acting in a direction perpendicular to the X-axis 12 also occur frequently as a result of which loads are produced at the electrodes due to the transversal piezoelectric effect. In order to ensure uniform transversal sensitivity of the piezoelement, the plates 1 are preferably superimposed so as to obtain symmetrical distribution of the Y-axes of the plates. This can be achieved in a simple manner by arranging the two connecting bridges 7 of each plate 1 straight away in symmetrical relation to the Y-axis of the plate and by varying its distance from the Y-axis designated by reference number 13 in FIG. 2 depending on the number of plates constituting the plate assembly. In the embodiment illustrated, comprising six superimposed plates 1, symmetrical distribution of the Y-axes 13 in the plate assembly is achieved for instance by offsetting the connecting bridges 7 by an angle of 120°.

Within the scope of the invention special electrodes consisting of metal disks or foils can be inserted between the plates 1, the said electrodes being also solidly jointed with the adjacent plates. In this case too, the advantage of a piezoelement forming a solid unit is obtained with the avoidance of split resilience and the assurance of positive cohesion between the component parts even if the plate assembly comprises large numbers of superimposed plates.

I claim:

1. A piezoelectric crystal unit, in particular for piezoelectric gauges, comprising a plurality of plates of piezoelectric material having electrodes in the form of electrically conductive coatings on both front surfaces thereof, at least one of the said electrodes of each plate being provided with a recess open to the periphery of the plate, connecting bridges in the form of web-shaped metal coatings extending from the electrode on one front surface of the plate across its peripheral area to the said recess of the electrode on the other front surface of said plate, the plates being superimposed face to face, wherein the extremities of the connecting bridges located within said recesses of adjacent plates being faced one to another and conductively interconnected, all plates being positively jointed to a compact plate assembly by diffusion welding.

2. A piezoelectric crystal unit according to claim 1, in which additional metal layers are provided inserted between the said electrodes of adjacent plates, said layers serving as a metallic bonding agent.

3. A piezoelectric crystal unit according to claim 1, in which the piezoelectric material is quartz.

References Cited by the Examiner

UNITED STATES PATENTS

| | | | |
|---|---|---|---|
| 2,096,826 | 10/1937 | Schrader | 310—8.7 |
| 2,479,926 | 8/1949 | Gravely | 310—9.8 |
| 2,864,013 | 12/1958 | Wood | 310—8.3 |
| 3,054,084 | 9/1962 | Parssinen et al. | 310—8.6 |
| 3,060,333 | 10/1962 | Bradley | 310—8.4 |
| 3,066,232 | 11/1962 | Branson | 310—9.8 |
| 3,075,098 | 1/1963 | Shoor | 310—9.1 |
| 3,113,288 | 12/1963 | Snavely | 310—9.1 |
| 3,117,768 | 1/1964 | Carlin | 310—9.7 |
| 3,179,826 | 4/1965 | Trott et al. | 310—9.7 |
| 3,187,207 | 6/1965 | Tomes | 310—9.8 |

MILTON O. HIRSHFIELD, *Primary Examiner.*

ORIS L. RADER, *Examiner.*

A. J. ROSSI, *Assistant Examiner.*